(12) United States Patent
Takata

(10) Patent No.: US 7,000,144 B2
(45) Date of Patent: Feb. 14, 2006

(54) INFORMATION MANAGEMENT APPARATUS, INFORMATION MANAGEMENT SYSTEM, AND INFORMATION MANAGEMENT SOFTWARE

(75) Inventor: Hidenori Takata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 596 days.

(21) Appl. No.: 09/742,413

(22) Filed: Dec. 22, 2000

(65) Prior Publication Data

US 2001/0016921 A1 Aug. 23, 2001

(30) Foreign Application Priority Data

Dec. 27, 1999  (JP) ............................................. 11-369457

(51) Int. Cl.
*G06F 11/00* (2006.01)

(52) U.S. Cl. .............................. 714/15; 705/59; 705/61
(58) Field of Classification Search ...................... 714/6, 714/15; 717/173, 178; 705/59, 61
See application file for complete search history.

(56) References Cited

U.S. PATENT DOCUMENTS

| 5,638,443 | A | | 6/1997 | Stefik et al. ................... 705/54 |
|---|---|---|---|---|
| 5,691,742 | A | | 11/1997 | O'Connor et al. .......... 345/835 |
| 5,852,713 | A | * | 12/1998 | Shannon ......................... 714/6 |
| 5,887,133 | A | | 3/1999 | Brown et al. ................ 709/200 |
| 5,909,023 | A | * | 6/1999 | Ono et al. ................... 235/380 |
| 5,943,650 | A | | 8/1999 | Kanno |
| 5,996,088 | A | * | 11/1999 | Frank et al. .................... 714/6 |
| 6,163,859 | A | * | 12/2000 | Lee et al. ...................... 714/38 |
| 6,343,280 | B2 | | 1/2002 | Clark ........................... 705/55 |
| 6,434,535 | B1 | | 8/2002 | Kupka et al. ................. 705/24 |
| 6,457,025 | B2 | | 9/2002 | Judson .................... 715/501.1 |
| 6,535,998 | B1 | * | 3/2003 | Cabrera et al. ............... 714/15 |
| 6,553,392 | B1 | * | 4/2003 | Mosher et al. .............. 707/204 |
| 6,553,507 | B1 | * | 4/2003 | Cohen ........................... 714/4 |
| 6,609,215 | B1 | * | 8/2003 | Hamilton et al. ............. 714/15 |
| 6,799,272 | B1 | | 9/2004 | Urata .......................... 713/171 |
| 2001/0016921 | A1 | | 8/2001 | Takata ......................... 714/15 |
| 2001/0034846 | A1 | | 10/2001 | Beery ............................ 705/1 |
| 2002/0049716 | A1 | | 4/2002 | Takata et al. .................. 707/1 |
| 2002/0059155 | A1 | * | 5/2002 | Takata et al. ................. 706/45 |

FOREIGN PATENT DOCUMENTS

| JP | 6-230847 | 8/1994 |
|---|---|---|
| JP | 10-82398 | 1/1998 |

* cited by examiner

*Primary Examiner*—Bryce P. Bonzo
(74) *Attorney, Agent, or Firm*—Fitzpatrick, Cella, Harper & Scinto

(57) ABSTRACT

A user machine provided with a system of a software battery is connected to a host machine for providing a battery through a communications line, and a specific battery in a user machine is charged. The user machine includes a program for communications with the host machine and a software battery management system. The host machine includes a program having a function of listing available batteries, and transmitting a specified battery. With such a configuration, a user can select any battery from among the batteries in the host machine through communications, and charge for his or her own machine.

7 Claims, 5 Drawing Sheets

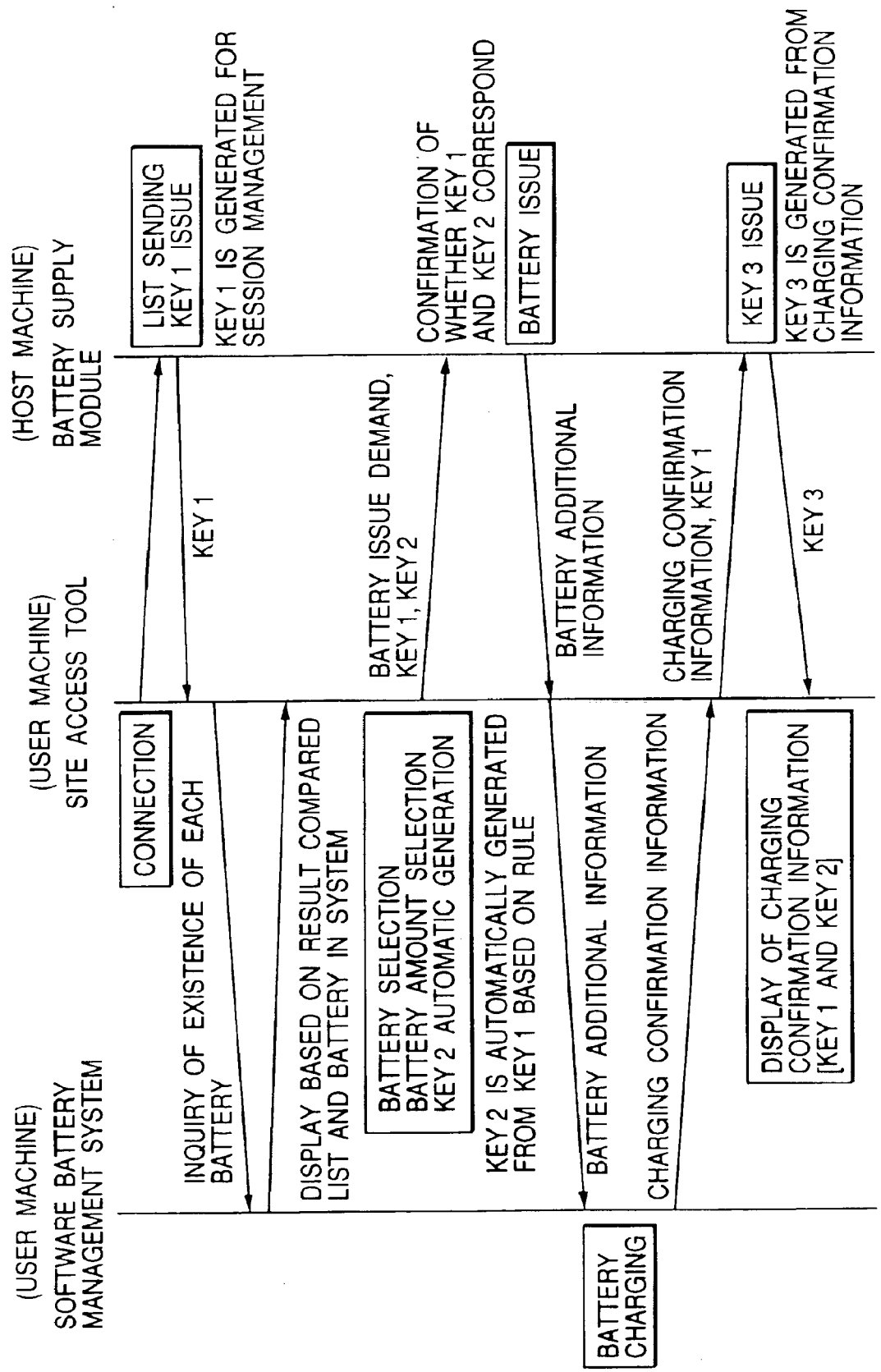

INFORMATION MANAGEMENT APPARATUS, INFORMATION MANAGEMENT SYSTEM, AND INFORMATION MANAGEMENT SOFTWARE

BACKGROUND OF THE INVENTION

1. Field of the Invention

The present invention relates to an apparatus and method for controlling the use of software and a medium for storing software.

2. Related Background Art

As a conventional method of limiting the use of software, software to be attached to a magazine has been limited in period (for example, 60 days).

Other methods of limiting the use of software are disclosed in the operation management system and the operation management method (Japanese Patent Registration No. 2810033, U.S. Pat. No. 5,943,650). According to the system and the method, the management control of the operation management system is limited by a battery storing data for use in managing the operation, and new operation management data is provided using an FD (floppy disk) when the software becomes inoperable by the operation management data of the battery. Therefore, in this method, an FD for the battery can be illegally copied. In addition, when the FD is mailed, it takes a long time (time lag) to send the FD to the destination, thereby possibly suspending the work of the user. Furthermore, there is the possibility that the FD can be lost or damaged.

Then, there are the following problem with the contents disclosed by the computer software rental method (Japanese Patent Publication No. 7-89305).

Problem with the use terminating process (When a host machine performs the use terminating process, the process cannot be performed when a communications appliance such as a modem, etc. becomes faulty, thereby charging a use rate for a non-use time. When a user machine performs the use terminating process, the process cannot be performed on the user machine side when a power failure occurs, thereby disabling the computation to be performed for a use time, hardly detecting illegal operations when a system date is processed when a reactivating process is performed after the power failure, etc. If they can be detected, a system date can be changed during the operation of an application although it is not an illegal operation (when the date is returned to 1999 Dec. 30 as an urgent countermeasure against the trouble at the start in 2000, etc.). In this case, it is not convenient if the application cannot he executed.

Therefore, it is limited to compute a use rate by controlling the use limit by the start or end of use (From To).

In the above mentioned method, since the same rates are charged for reference only and for a large number of inputs, the rate seems to be relatively high for the reference only (the accounting process cannot be performed depending on the use level).

SUMMARY OF THE INVENTION

On the other hand, according to the present invention, the battery (operation management data) can be charged in real time, there can be a smaller possibility that copies are made, the battery (operation management data) can be automatically charged when it is running lower than a predetermined level, since the battery is sequentially used, the operation of the system date is insignificant, and even if an application abnormally terminates all of a sudden due to power failure, there occurs no confusion about an accounting process, and a payment is made in advance for the battery and there is no time lag until an accounting process is performed, so that the provider can easily manage funds and on the other hand, the user can avoid overusing the battery (over budget) before he or she knows it.

To attain the above mentioned object, a storage medium according to the present invention stores software and a management software for managing the software, and the management software has the step of restoring the software to a state in which the software can be managed.

To attain the above mentioned object, an information processing apparatus according to the present invention includes a storage means for storing management software for managing software, and the management software includes: means for restoring the software to a state in which the software can be managed; and means for connecting to a predetermined site to allow the means for restoring the software to restore the management software to a state in which the management software can be managed.

To attain the above mentioned object, an information processing apparatus includes: means for restoring management software for managing software to a state in which the management can be managed; and means for connecting to a predetermined site to allow the means for restoring the software to restore the management software to a state in which the management software can be managed.

To attain the above mentioned object, an information processing apparatus includes: means for restoring management software for managing software to a state in which the management can be managed; and means for connecting to a predetermined site to allow the means for restoring the software to restore the management software to a state in which the management software can be managed.

To attain the above mentioned object, an information processing apparatus includes: means for restoring management software for managing software to a state in which the management can be managed; and means for connecting to a predetermined site to allow the means for restoring the software to restore the management software to a state in which the management software can be managed.

A host apparatus according to the present invention restores management software to a state in which the management software can be managed by communicating with an information processing apparatus including: means for restoring the management software for managing software to a state in which the management software can be managed; and means for connecting to a predetermined site for restoring the management software by the means for restoring the management software to the state in which the management software can be managed, and further includes means for transmitting information for use in restoring the management software to the state in which the management software can be managed at a request from the information processing apparatus.

BRIEF DESCRIPTION OF THE DRAWINGS

FIG. 5 shows a protocol of a user machine and a host machine.

DETAILED DESCRIPTION OF THE PREFERRED EMBODIMENTS

The preferred embodiments of the present invention will be described below by referring to the attached drawings.

Figure 1:
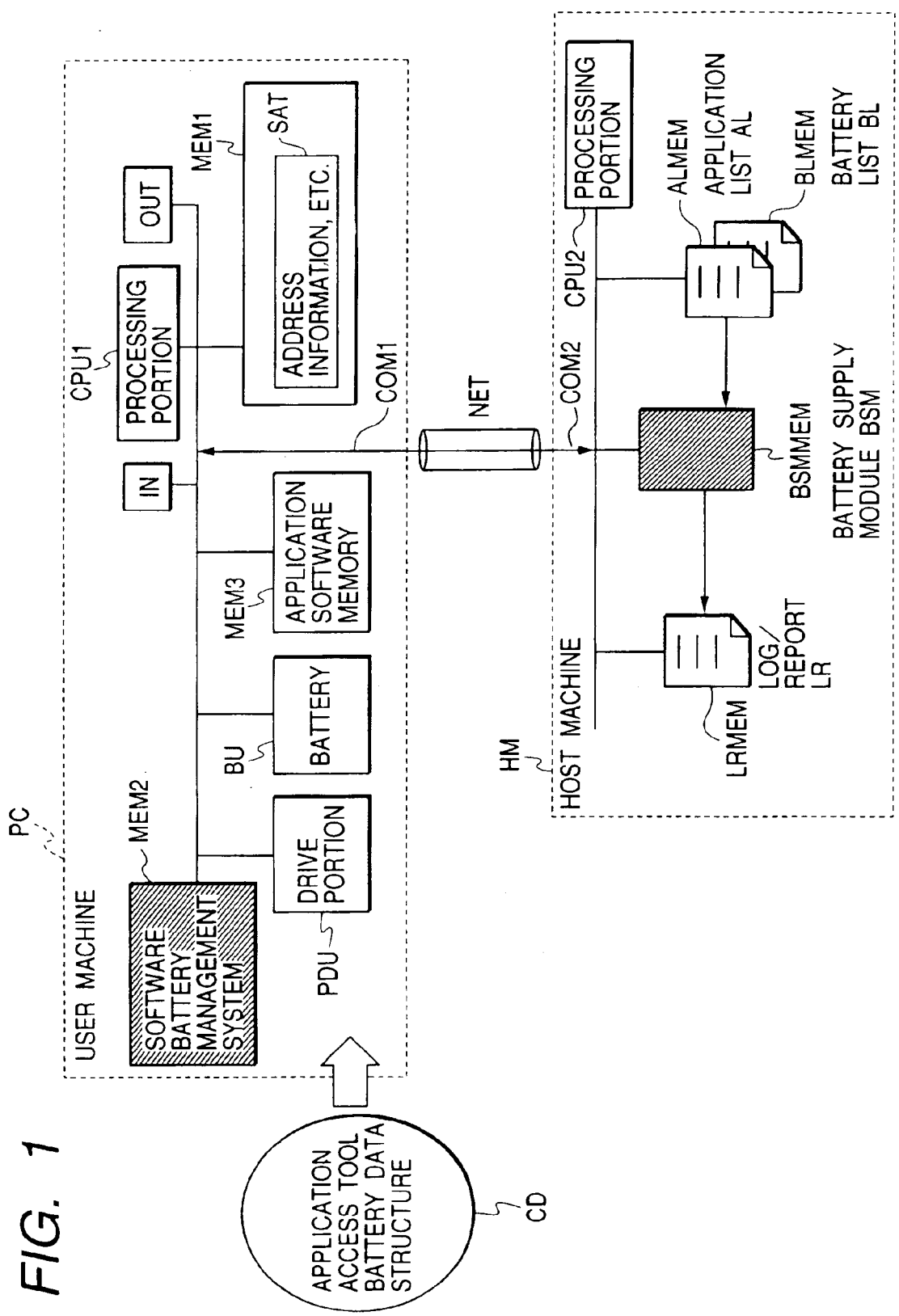
FIG. 1 is a block diagram of the outline of the present invention.

In FIG. 1, an SBMS is software relating to a software battery management system, and a site access tool SAT charges a battery from a host machine HM in cooperation with the system on a user machine PC storing the software.

The SAT is a site access tool, and provides a user with the information about the host machine HM to be connected to using, for example, a portable storage medium CD (compact disk), an MD (minidisk), a FDD (floppy disk), or semiconductor memory, etc. Otherwise, when software is provided from the site in the communications, the information about the host machine HM can be received together with application software through a communications medium, or only the software can be received.

A battery supply module BSM is incorporated into a host machine HM to provide a user-selected battery at a predetermined position by the amount specified by the user. The predetermined position is set in the user machine PC, or in the memory of the server. The host machine HM and the user machine PC are connected to network or a Internet NET.

FIG. 1 is a block diagram of the present invention. In FIG. 1, a reference characters PC denote a computer of the user machine, and comprises: a processing unit CPU for performing a process procedure (performed by the software of a site access tool and a software battery management system) described later and shown in FIG. 3; an input unit IN for inputting information; an output unit OUT for outputting information; a storage unit MEM1 for storing the software of the site access tool executed by the processing unit CPU; a storage unit MEM2 for storing the software of a software battery management system executed by the processing unit CPU; a battery BU of storage means (for example, a floppy, semiconductor memory, a hard disk, etc.) for storing data (an application ID, a battery ID, and a predetermined value for operation of application software) for control of the operation of the application software; a storage unit MEM3 for storing application software; a drive unit PDU for reading data from and writing data to a removable storage unit; and a communications line unit COM1 for connection to a network or Internet NET.

Then, a removable storage medium CD is installed, and the data is loaded from the storage medium CD to the computer PC. At least a setup application software and the operation software for control of the valid period of the application software are stored on the storage medium CD and installed to the computer PC.

The operation software stored on the storage medium CD comprises a site access tool and a battery data structure list. When the operation software is setup in the user machine from the storage medium CD, the battery data structure list contains a predetermined value (a value corresponding to, for example, several hours, relating to the predetermined application software as a trial process) as an initial value, and the value of the above mentioned battery data structure list is decreased each time the application software to be managed by the operation software is used in the user machine. When the value decreases, a predetermined value of data transmitted from a communications line or an external storage medium is rewritten to the battery data structure list, thereby allowing the application software to be reused. The operation software contains the software management system and the site access tool.

The reference characters HM denote a host machine. The host machine comprises: a processing unit CPU2 for performing the process procedure (process procedure by a program of the battery supply module BSM) shown in FIG. 4; a storage unit BMEM for storing the software of the battery supply module executed by the processing unit CPU2; a storage unit ALMEM for storing the application list; a storage unit BLMEM for storing a battery list; a storage unit LLMEM for storing a log report; and a communications line unit COM2 for connection to a network and Internet. When the valid period of the application software is extended on the computer PC, the computer PC communicates with the host machine HM to extend the valid period by rewriting the above mentioned value.

Figure 2:
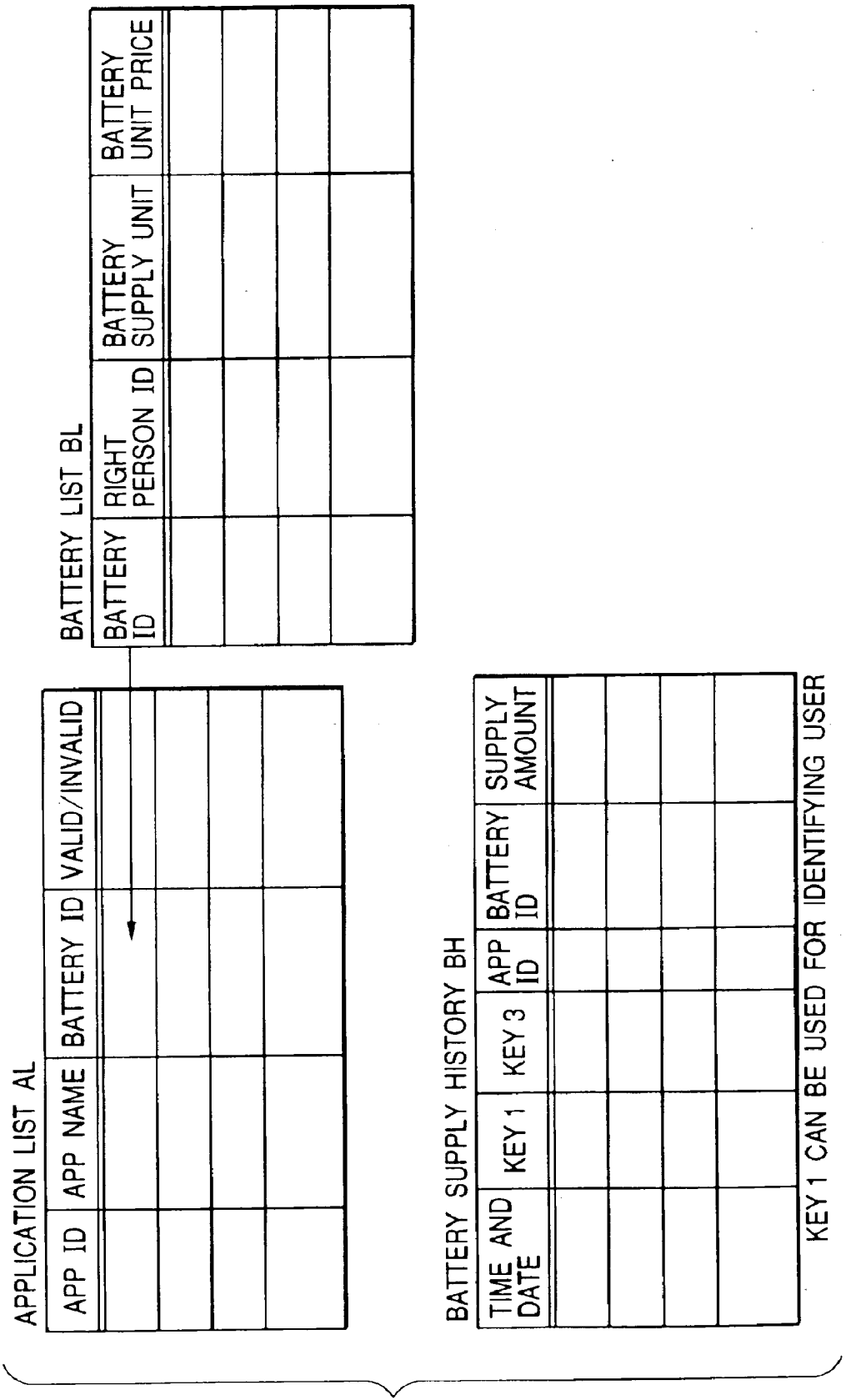
FIG. 2 shows a data structure in a battery supply module.

The application software list AL, the battery list BL, and the battery supply history list BH are shown in FIG. 2. Using the lists, the application software can be matched, and the battery unit price, etc. can be set for each piece of application software.

Activating Procedure (1) The step is performed by the site access tool SAT of the user machine according to the address information about the information host machine HM. In the case of Internet, it corresponds to an IP address and a URL. The user machine PC is connected to the host machine HM through a network using the site access tool SAT.

(2) In the step performed by the battery supply module BSM of the host machine HM, listing information about available batteries is provided. The information is displayed as a list on the screen of the display device of the user machine. The user searches for a battery for a target application from the displayed list, and selects the corresponding portion on the list by clicking the mouse button, etc.

(3) In addition, by operating the site access tool SAT which receives the battery listing information, an inquiry is issued to the software battery management system SBMS about whether or not each battery has already been managed, and batteries are displayed on the screen of the user machine PC with managed batteries distinguished from non-managed batteries.

(4) According to the information obtained from the application list AL and the battery list BL transmitted from the host machine HM, the user selects a desired battery and its amount from the displayed list by moving the cursor to select a target battery. The user also can input a value using an input device without using the cursor.

(5) By operating the site access tool SAT, the user-selected battery and its amount are transmitted to the battery supply module BSM.

(6) Based on the received battery and the amount, battery addition information is generated in the battery BU by the battery supply module BSM, and is transmitted to the site access tool SAT. The generated information is stored as a log.

(7) The battery addition information is received by the site access tool SAT, and the site access tool SAT passes the information to the software battery management system SBMS. Then, the information (the value for control of the application operating time) is written to the battery BU, and it is confirmed that the battery BU has been charged.

(8) The confirmation information is transmitted by the site access tool SAT to the battery supply module BSM.

(9) The confirmation information is recorded in addition to the above mentioned log by the battery supply module BSM.

(10) When a series of communications terminate, the site access tool SAT terminates the communications with the host machine HM.

It is obvious that, after a battery has been supplied, the value decreases each time an application is performed in the user machine PC, the operation management data of the battery BU has finally been exhausted, and the application software cannot be used.

Figure 3:
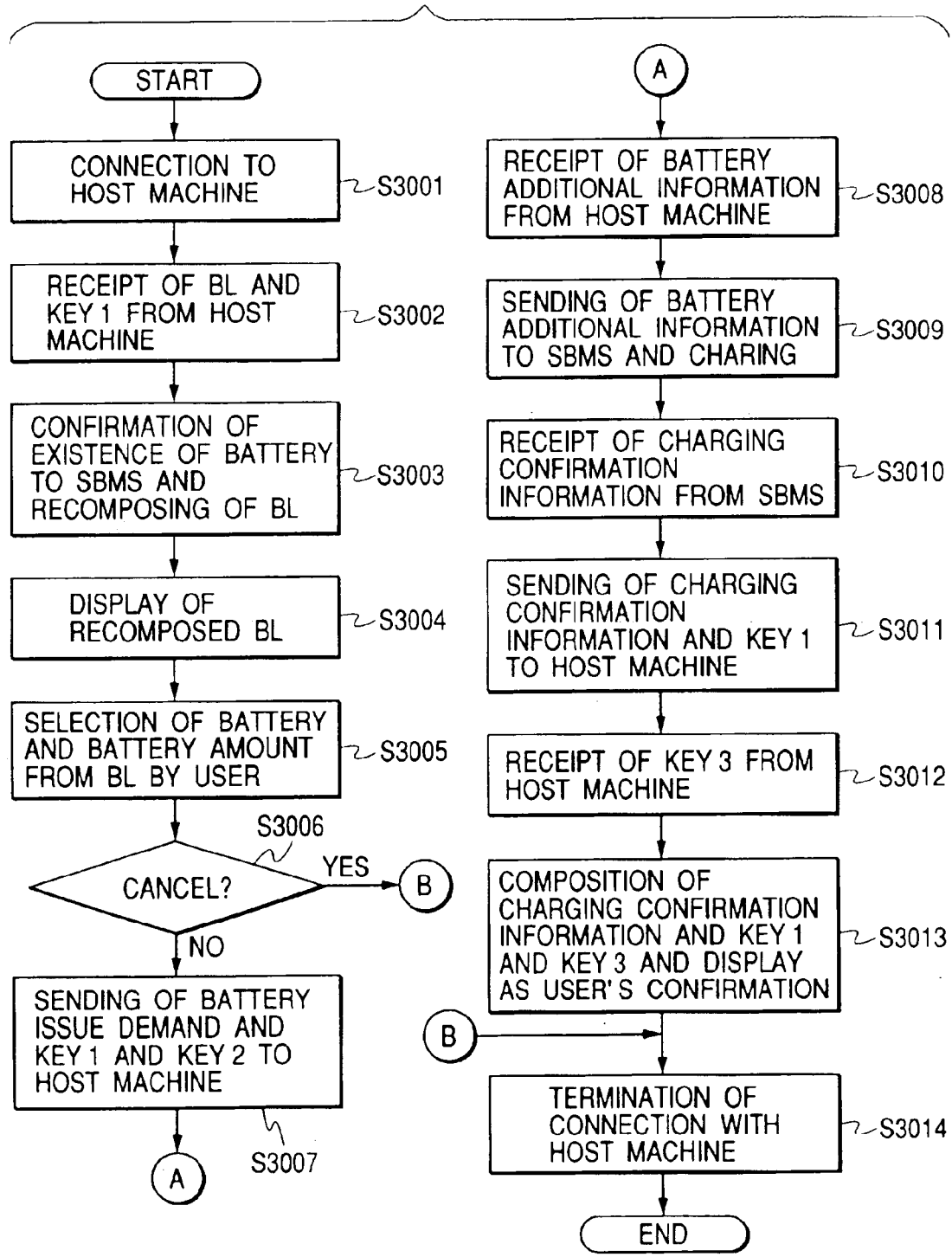
FIG. 3 is a flowchart showing an embodiment of the present invention.
Figure 4:
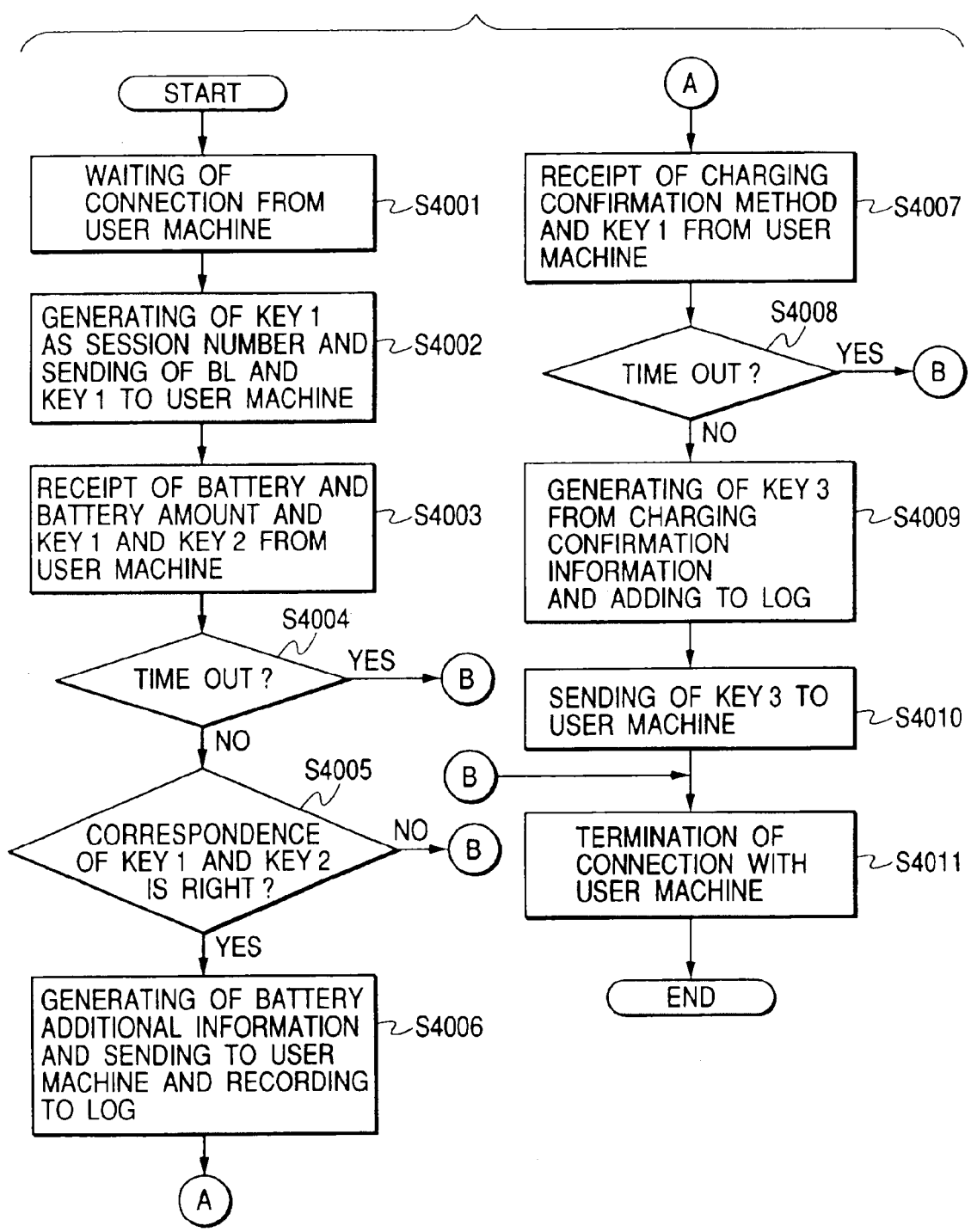
FIG. 4 is a flowchart of the battery supply module.

The above mentioned processes are described below furthermore in detail by referring to the sequence flow of the host machine HM shown in FIG. 4 performed by each piece of software of the site access tool SAT, the software battery management system, and the battery supply module BSM, and the control flow of the computer PC shown in FIG. 3.

In step S3001, the process unit CPU1 is connected to the host machine HM according to the IP address or the URL. It if has been connected, then the processing unit CPU1 receives a battery list BL and a key 1 list of the storage unit BLMEM from the host machine HM in S3002. Then, in S3003, the processing unit CPU1 inquires the existence of the value of the battery BU and the remainder of the software battery management system SBMS, and recomposes the battery list BL. Then, in S3004, the battery list BL recomposed by the processing unit CPU1 is displayed on the display screen of the computer PC. Then, in S3005, the processing unit CPU1 operates the mouse and moves the cursor to select the battery BU and its amount from the battery list BL displayed on the display screen. Then, in S3006, the processing unit CPU1 determines whether or not cancellation is selected. If the process is continued, the processing unit CPU1 transmits a battery issue request, key 1, and key 2 to the host machine HM in S3007. In the next step S2008, the processing unit CPU1 receives the battery addition information from the host machine HM. In step S3009, the processing unit CPU1 transmits the battery addition information to the software battery management system, and charges the battery. In S3010, the processing unit CPU1 receives charging confirmation information from the software battery management system SBMS. In step S3011, the processing unit CPU1 transmits the charging confirmation information together with the key 1 to the host machine HM. In step S3012, the processing unit CPU1 receives a key 8 from the host machine HM.

In step S3013, the processing unit CPU1 combines the charging confirmation information with the keys 1 and 3 to display the result for confirmation of a user. In step S3014, the processing unit CPU1 terminates the connection with the host machine HM.

Then, the function of the battery supply module BSM is described below by referring to the sequence shown in FIG. 5 and based on FIG. 4.

In step S4001, the processing unit CPU2 waits for the connection from the user machine PC. In step S4002, the processing unit CPU2 generates a key as a session number, and transmits the battery list and the key 1 to the user machine PC. In step S4003, the processing unit CPU2 receives the amount of the battery, and the keys 1 and 2 from the user machine PC. In S4004, the processing unit CPU2 makes a time-out check. If a time-out has not occurred, the processing unit CPU2 determined in step S4005 whether or not the correspondence between the keys 1 and 2 is correct. If yes, then the processing unit CPU2 generates the battery addition information in step S4006, transmits it to the user machine PC, and stores it in the log LL of the storage unit LLMEM. In step S4007, the processing unit CPU2 receives the charging confirmation information and the key 1 from the user machine PC. In step S4008, the processing unit CPU2 determines whether or not a time-out has occurred. If not, it generates the key 3 according to the charging confirmation information in step S4009, and adds it to the log. In step S4010, the processing unit CPU2 transmits the key 3 to the user machine PC.

Then, in step S4011, the processing unit CPU terminates the connection to the user machine PC.

By the above mentioned connection, the battery is charged, and the application is performed. By performing the application, the charging process is performed again in the above mentioned process, thereby performing the application again. In the above mentioned example, the host corresponds one to one to the user machine. However, there can be a plurality of hosts. In this case, it is obvious that a host is to be specified according to the information in the site access tool. Otherwise, the site information is downloaded and specified through Internet.

In the above mentioned example, application software is stored in a terminal unit, and the operation of the application software is managed by a battery. However, the effect can also be obtained by setting application software and a battery in a server of a network, and by using them at a terminal unit. That is, application software is used through a network, the use of the application software is controlled by a battery, and the value of the battery is supplemented when the value of the battery decreases.

According to the present invention, the information for use in charging a battery is not transmitted as a file, but communications are established through a program, thereby avoiding making copies in a simple operation by, for example, copying a file, supplied batteries can be distinguished between those already used by the user and those not used by the user, thereby not confusing the user during the operation, and since the confirmation information about the battery charge is recorded in the log, means for guaranteeing the charge of a user machine can be provided.

What is claimed is:

1. A software battery information management apparatus connected to a client terminal via a network, comprising:

a first key creation means for creating a first key for a session management in response to a request from said client terminal;

first transmission means for transmitting said created first key to said client terminal;

generating means for generating display information for displaying an available battery on a list;

second transmission means for transmitting the generated display information to said client terminal;

a first reception means for receiving said first key, a second key, a battery selected from the displayed list, and information of remaining amount of a battery from said client terminal;

judging means for judging if said first key matches said second key;

battery issuance means for issuing battery addition information corresponding to the selected battery for said client terminal in accordance with the judged result;

a second reception means for receiving confirmation information of charging of a battery from said client terminal; and log information creation means for creating log information on the basis of said confirmation information of charging of a battery.

2. An apparatus according to claim 1, wherein the battery amount indicated by the information of remaining amount of a battery is updated so as to decrease in accordance with an increase of an execution amount of software.

3. An apparatus according to claim 1, wherein the battery amount indicated by the information of remaining amount of a battery is updated so as to decrease in accordance with an increase of an execution time of software.

4. A method of managing software battery information for a client terminal connected to a network, said method comprising the steps of:
- creating a first key for management of a session in response to a request from the client terminal;
- transmitting the created first key to the client terminal;
- generating display information for displaying an available battery on a list;
- transmitting the generated display information to said client terminal;
- receiving the first key, a second key, a battery selected from the displayed list, and remaining battery amount information from the client terminal;
- judging if the first key and the second key match;
- issuing battery addition information corresponding to the selected battery for the client terminal in accordance with the judged result;
- receiving battery charge confirmation information from the client terminal; and
- creating log information on the basis of the battery charge confirmation information.

5. A computer-readable medium storing program code for a method of managing software battery information for a client terminal connected to a network, said method comprising the steps of:
- creating a first key for management of a session in response to a request from the client terminal;
- transmitting the created first key to the client terminal;
- generating display information for displaying an available battery on a list;
- transmitting the generated display information to said client terminal;
- receiving the first key, a second key, a battery selected from the displayed list, and information of remaining amount of a battery from the client terminal;
- judging if the first key matches with the second key;
- issuing battery addition information corresponding to the selected battery for the client terminal in accordance with the judged result;
- receiving battery charge confirmation information from the client terminal; and
- creating log information on the basis of the battery charge confirmation information.

6. A client terminal connected to a software battery information management apparatus through a network, comprising:
- first transmission means, arranged to connect with said software battery information management apparatus to transmit a request thereto;
- first key receiving means for receiving a first key for session management, generated by the management apparatus in response to said request;
- receiving means for receiving display information for displaying, on a list, a battery which is available from said software battery information management apparatus;
- selection means for selecting a desired battery from the displayed list;
- second transmission means for transmitting said first key, a second key, the selected battery, and battery amount information to said software battery information management apparatus;
- acquisition means for acquiring battery addition information corresponding to the selected battery in accordance with a result of comparison by said management apparatus of said first and second keys transmitted by said second transmission means; and
- third transmission means for transmitting battery charge confirmation information to said software battery information management apparatus in response to the acquisition of the battery addition information,
- wherein said software battery information management apparatus generates log information on the basis of the battery charge confirmation information.

7. A client terminal according to claim 6, further comprising:
- inquiring means for inquiring whether or not the battery which is available from said software battery information management apparatus, has already been managed; and
- display control means for affecting control so as to display a battery with classification thereof in accordance with a result of the inquiry by said inquiring means.

* * * * *